United States Patent
Dooley et al.

(10) Patent No.: US 7,089,112 B2
(45) Date of Patent: Aug. 8, 2006

(54) METHOD OF DETERMINING THE POSITION OF A MOBILE UNIT

(75) Inventors: Saul R. Dooley, Reigate (GB); Andrew T. Yule, Felbridge (GB); Christopher B. Marshall, Haywards Heath (GB)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 10/462,312

(22) Filed: Jun. 13, 2003

(65) Prior Publication Data

US 2003/0212487 A1 Nov. 13, 2003

Related U.S. Application Data

(62) Division of application No. 09/957,128, filed on Sep. 20, 2001, now Pat. No. 6,618,671.

(30) Foreign Application Priority Data

Sep. 20, 2000 (GB) ............................................. 0023002
Nov. 18, 2000 (GB) ............................................. 0028168

(51) Int. Cl.
  *H04B 7/185* (2006.01)

(52) U.S. Cl. ........................ 701/213; 701/214; 701/215
(58) Field of Classification Search ................. 701/213, 701/214, 215, 216; 342/357, 357.03, 357.01, 342/357.02
  See application file for complete search history.

(56) References Cited

U.S. PATENT DOCUMENTS

| | | | |
|---|---|---|---|
| 5,621,646 A | 4/1997 | Enge et al. | |
| 5,663,734 A | 9/1997 | Krasner | |
| 5,702,070 A | 12/1997 | Waid | |
| 5,841,396 A | 11/1998 | Krasner | |
| 5,874,914 A | 2/1999 | Krasner | |
| 6,043,777 A | 3/2000 | Bergman et al. | |
| 6,208,299 B1 * | 3/2001 | Lindmark et al. | ... 343/700 MS |
| 6,411,254 B1 | 6/2002 | Moeglein et al. | |
| 6,469,663 B1 | 10/2002 | Whitehead et al. | |
| 6,473,030 B1 | 10/2002 | McBurney et al. | |
| 6,473,694 B1 | 10/2002 | Akopian et al. | |
| 6,496,778 B1 | 12/2002 | Lin | |
| 6,549,828 B1 * | 4/2003 | Garrot et al. | ................... 701/1 |

FOREIGN PATENT DOCUMENTS

| | | |
|---|---|---|
| WO | WO9721109 | 6/1997 |
| WO | WO0010028 | 2/2000 |

OTHER PUBLICATIONS

U.S. Department of Transportation Federal Aviation Administration Specification, WIde Area Augmentation System (WAAS), Sep. 21, 1999.

\* cited by examiner

*Primary Examiner*—Richard M. Camby

(57) ABSTRACT

A method of determining the position of a mobile unit (MS1) having a GPS receiver (24) is disclosed. The method comprising the steps of measuring mobile unit pseudoranges at the mobile unit (MS1) using the GPS receiver (24); providing reference pseudoranges corresponding to a reference location situated remote from the mobile unit (BS1); and determining the position of the mobile unit (MS1) relative to the reference location (BS1) as a function of both the reference pseudoranges and the mobile unit pseudoranges.

7 Claims, 2 Drawing Sheets

METHOD OF DETERMINING THE POSITION OF A MOBILE UNIT

This application is a divisional of application Ser. No. 09/957,128 filed Sep. 20, 2001 now U.S. Pat. No. 6,618,671.

This invention relates to a method of determining the position of a mobile unit comprising a GPS receiver.

It is well known to provide a GPS receiver in which replica GPS satellite pseudorandom noise (PRN) code signals are continuously generated and correlated with received GPS signals in order to acquire them. Typically, as the replica codes are likely to have a different code phase to those of the received GPS signals and also a different frequency due to Doppler shift between the receiver and orbiting satellites, a two dimensional code frequency/phase sweep is employed whereby such a sweep will eventually result in the incoming PRN code having the same frequency and code phase as that of the locally generated replica. If detected, the code is acquired and tracked, and the pseudo-range information may be retrieved from which the position of the receiver may be determined. Position determination is typically done by conventional but complex navigation computation involves the resolving of at least 4 non-linear equations using an iterative technique such as linearisation. For example, see section 2.4.2 of chapter 2 "Fundamentals of Satellite Navigation" of GPS Principles and Applications (Editor, Kaplan) ISBN 0-89006-793-7 published by Artech House.

It is further known to provide a mobile cellular telephone incorporating such a GPS receiver for the purpose of enabling operators of cellular telephone networks to determine the location from which a call is made and, in particular, for an emergency call to the emergency services. Of course for an emergency call, it is desirable for the call location to be available as soon as possible, however, from a "cold start" where the GPS receiver does not have access to up to date ephemeris data or even worse from a "factory cold start" where the GPS receiver does not have an up to date almanac, the time to first fix (TTFF) can be anywhere between 30 seconds and 5 minutes.

In order to reduce the TTFF, a GPS receiver may be provided with base station assistance in order to acquire GPS signals more quickly. Such assistance may include the provision by the base station to the receiver of a precision carrier frequency reference signal for calibrating the local oscillator used in the GPS receiver and, as obtained by the base station, the data message for up to date satellite almanac and ephemeris data from which Doppler shift for satellites in view can be determined together with the current PRN code phase. With such assistance, it is possible to sweep only a narrowed range of frequencies and code phases in which the GPS PRN code is known to occupy, thereby reducing the number of code instances that need to be checked and thus reducing the time for code acquisition. Base station assistance is further described in U.S. Pat. Nos. 5,841,396 and 5,874,914 which are incorporated herein by reference.

Whilst such base station assistance enables the GPS spread spectrum signals to be acquired more quickly (and hence obtain pseudorange measurements from the GPS satellites to the GPS receiver more quickly), it does not in any way simplify the complex navigation computation required in the GPS receiver to resolve the measured pseudoranges in order to return a position fix. Accordingly, such GPS receivers still require complex and power hungry processors to perform the necessary navigation computation. Furthermore, with respect to GPS receivers incorporated in mobile cellular telephones, power consumption is a particularly acute problem given the fashion for the miniaturisation of mobile telephones (and their battery packs) for both aesthetic and ergonomic reasons.

It is therefore an object of the present invention to provide an improved method of determining the position of a mobile unit having a GPS receiver in which the necessary navigation computation and associated power consumption in the mobile unit is reduced.

According to a first aspect of the present invention, such a method is provided comprising the steps of measuring mobile unit pseudoranges at the mobile unit using the GPS receiver; providing reference pseudoranges corresponding to a reference location situated remote from the mobile unit; and determining the relative position of the mobile unit, i.e. relative to the reference location, as a function of both the reference pseudoranges and the mobile unit pseudoranges. This may be, for example, as a function of the difference between the reference pseudoranges and the mobile unit pseudoranges.

From the reference location and the relative position of the mobile unit, the absolute position of the mobile unit may also be determined.

To further simplify the necessary navigation computation, the method may further comprise the step of providing GPS satellite position information relative to the reference location wherein the relative position of the mobile unit is further determined as a function of the GPS satellite position information. For example, the GPS satellite position information may be provided in the form of normalised direction vectors of the GPS satellites relative to the reference location.

In one preferred method, the position of the mobile unit $(X_m, Y_m, Z_m)$ relative to the reference location $(X_{ref}, Y_{ref}, Z_{ref})$ is determined using the following approximation:

$$\begin{pmatrix} X_m - X_{ref} \\ Y_m - Y_{ref} \\ Z_m - Z_{ref} \\ c_m - c_{ref} \end{pmatrix} \approx H^{-1} \begin{pmatrix} PSR_{m1} - PSR_{ref1} \\ PSR_{m2} - PSR_{ref2} \\ PSR_{m3} - PSR_{ref3} \\ PSR_{m4} - PSR_{ref4} \end{pmatrix} \quad \text{[Equation 1]}$$

where $c_m$ and $c_{ref}$ are the GPS clock errors at the mobile unit and the reference location respectively; $PSR_{mn}$ and $PSR_{refn}$ are the mobile unit and reference location pseudoranges respectively; and wherein $H^{-1}$ is the inverse of matrix H which includes normalised direction vectors of satellites relative to the reference location in the form:

$$H = \begin{pmatrix} \frac{X_1 - X_{ref}}{R_{1-ref}} & \frac{Y_1 - Y_{ref}}{R_{1-ref}} & \frac{Z_1 - Z_{ref}}{R_{1-ref}} & 1 \\ \frac{X_2 - X_{ref}}{R_{2-ref}} & \frac{Y_2 - Y_{ref}}{R_{2-ref}} & \frac{Z_2 - Z_{ref}}{R_{2-ref}} & 1 \\ \frac{X_3 - X_{ref}}{R_{3-ref}} & \frac{Y_3 - Y_{ref}}{R_{3-ref}} & \frac{Z_3 - Z_{ref}}{R_{3-ref}} & 1 \\ \frac{X_4 - X_{ref}}{R_{4-ref}} & \frac{Y_4 - Y_{ref}}{R_{4-ref}} & \frac{Z_4 - Z_{ref}}{R_{4-ref}} & 1 \end{pmatrix} \quad \text{[Equation 2]}$$

where $R_{i-ref}$ is the range between the $i^{th}$ satellite and the reference location.

The reference pseudoranges and/or the GPS satellite position information may be provided using a GPS receiver located at the reference location. This has the advantage that the resultant position fix incorporates the advantages of differential GPS (DGPS) in that errors which, for example, a standard position service (SPS) NAVSTAR GPS could not compensate for such as selective availability, atmospheric effects and perhaps relativistic effects can indeed be compensated for.

As an alternative to providing the reference pseudoranges and/or the GPS satellite position information by using a GPS receiver located at the reference location, they may be provided by calculation based on the reference location and GPS satellite signal information obtained from a GPS receiver located remote from the reference location. Where this is the case, the clock offset at the reference location would of course be a notional offset given that the GPS receiver is not in fact located at the reference location.

The mobile unit pseudoranges may be transmitted from the mobile unit to a communications base station such that the relative position of the mobile unit is determined remote from the mobile unit.

Alternatively, the reference pseudoranges may be transmitted from a communications base station to the mobile unit and the relative position of the mobile unit determined at the mobile unit. In this case, the relative position of the mobile unit may be transmitted from the mobile unit to the communications base station. Also, the reference location may be is transmitted from the communications base station to the mobile unit and the absolute position of the mobile unit determined from both the reference location and the relative position of the mobile unit. The absolute position of the mobile unit may then be transmitted back to the communications base station.

For convenience, the reference location may geographically coincide with the location of the communications base station, for example, where a GPS receiver for providing reference pseudoranges is located at the communications base station.

Also provided in accordance with the first aspect of the present invention is a further method of determining the position of a mobile unit having a GPS receiver comprising the steps of measuring pseudoranges at the mobile unit; determining the position of the mobile unit relative to a nearby reference location using the pseudoranges; and determining the absolute position of the mobile unit from both the reference location and the relative position of the mobile unit to the reference location.

Where NAVSTAR GPS is concerned, the ephemeris data is provided as a set of Keplerian parameters (with added perturbation terms) whereas in order to simplify the navigation computation such as in accordance with equation 2 above, it is necessary to express the direction of the satellites relative to the reference location in vector form. As such, and in accordance with a second aspect of the present invention, a further method of determining the position of a mobile unit having a GPS receiver is provided comprises the steps of measuring mobile unit pseudoranges at the mobile unit using the GPS receiver; receiving GPS ephemeris data in the form of Keplerian parameters at a reference location located remote from the mobile unit; calculating from the ephemeris data satellite vector information in Cartesian form describing either or both of the position or movement of GPS satellites; providing the satellite vector information to the mobile unit; and determining the position of the mobile unit as a function of the satellite vector information and the mobile unit pseudoranges.

The satellite vector information may comprise position (x, y, z), velocity $(\dot{x},\dot{y},\dot{z})$, acceleration $(\ddot{x},\ddot{y},\ddot{z})$, $4^{th}$ (i.e. jerk) and higher order vectors, each describing either the position or movement of the GPS satellites.

Further provided in accordance with the present invention is a mobile unit as claimed in claims 22 to 29 and positioning apparatus as claimed in claims 30 to 37.

The above and other features and advantages of the present invention will be apparent from the following description, by way of example, of an embodiment of a mobile cellular telephone comprising a GPS receiver for use in a cellular telephone network with reference to the accompanying drawings in which.

Figure 1:
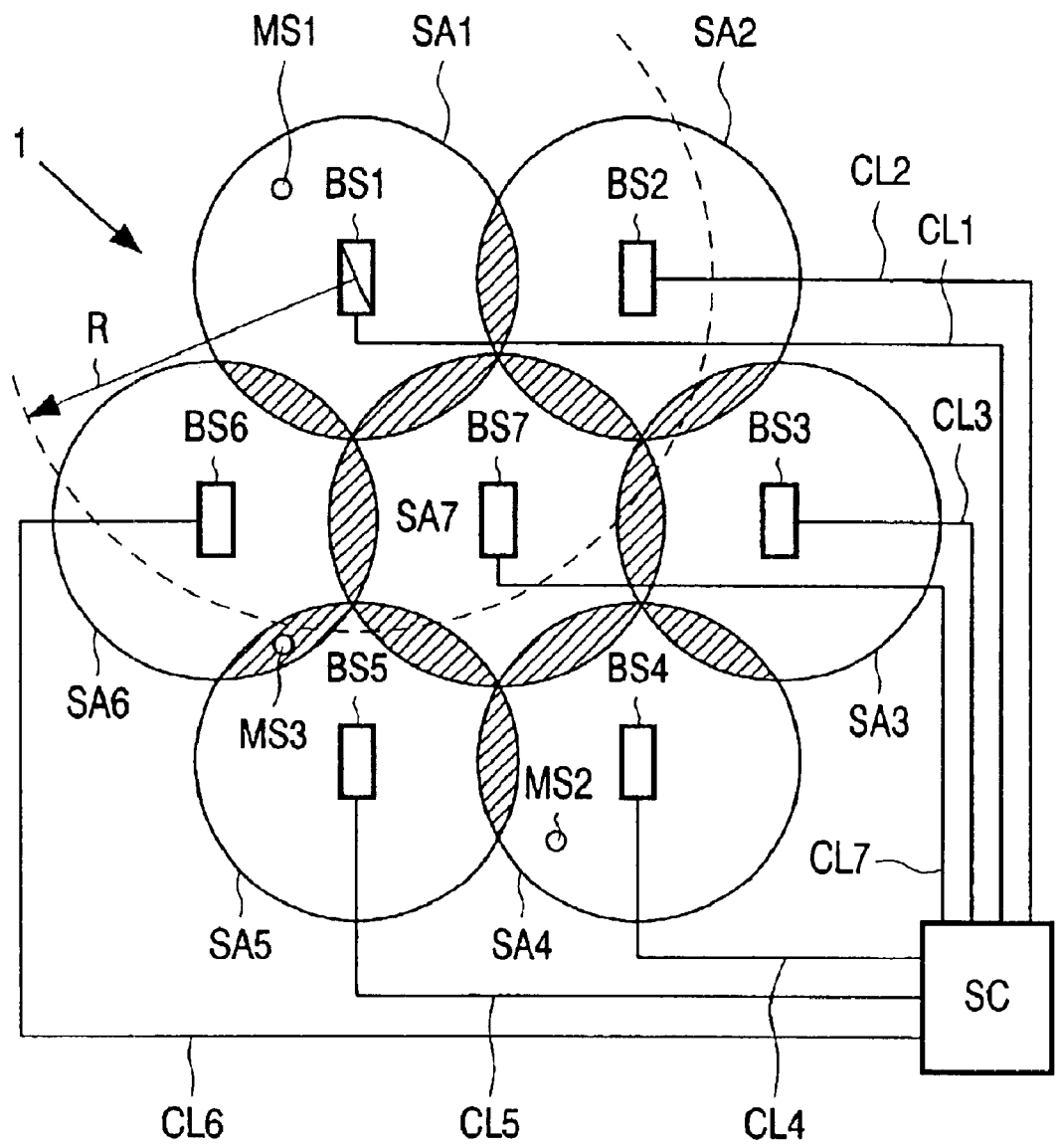
FIG. 1 shows, schematically, the geographic layout of a cellular telephone network.

The geographical layout of a conventional cellular telephone network 1 is shown schematically in FIG. 1. The network comprises a plurality of base stations BS of which seven, BS1 to BS7, are shown, situated at respective, mutually spaced geographic locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller SC provided with a two-way communication link, CL1 to CL7 respectively, to each base station BS1 to BS7. Each of these communication links may be, for example, a dedicated land-line. The system controller SC may, furthermore, be connected to a the public switched telephone network (PSTN) to enable communication to take place between a mobile cellular telephone MS1 and a subscriber to that network. A plurality of mobile cellular telephones MS are provided of which three, MS1, MS2 and MS3 are shown, each being able to roam freely throughout the whole region, and indeed outside it.

Figure 2:
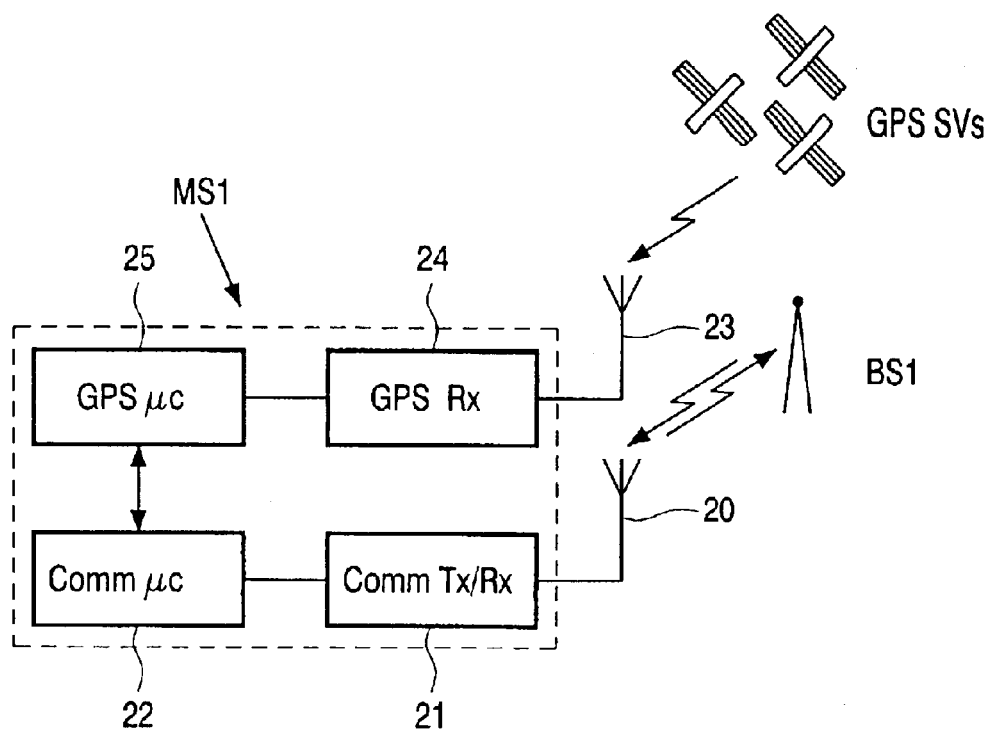
FIG. 2 shows, schematically, the mobile cellular telephone MS1 of FIG. 1 in greater detail.

Referring to FIG. 2, mobile cellular telephone MS1 is shown in greater detail comprising a communications transmitter (Comm Tx) and receiver (Comm Rx) 21 connected to a communications antenna 20 and controlled by a communications microprocessor (Comm μc) 22 for communication with the base station BS1 with which it is registered. The design and manufacturing of such telephones for two-way communication within a cellular telephone network are well known, those parts which do not form part of the present invention will not be elaborated upon here further.

In addition to the conventional components of a mobile telephone, telephone MS1 further comprises a GPS receiver (GPS Rx) 24 connected to a GPS antenna 23 and controlled by a GPS microprocessor (GPS μc) 25 receiving GPS spread spectrum signals transmitted from orbiting GPS satellites. When operative, the GPS receiver 24 may receive NAVSTAR SPS GPS signal through an antenna 23 and pre-process them, typically by passive bandpass filtering in order to minimise out-of-band RF interference, preamplification, down conversion to an intermediate frequency (IF) and analog to digital conversion. The resultant, digitised IF signal remains modulated, still containing all the information from the available satellites, and is fed into a memory of the GPS microprocessor 25. The GPS signals may then be are acquired and tracked for the purpose of deriving pseudorange information. Such methods for GPS signal acquisition and tracking are well known, for example, see chapter 4 (GPS satellite signal characteristics) & chapter 5 (GPS satellite signal acquisition and tracking) of GPS Principles and Applications, ibid. The GPS microprocessor 25 may be implemented in the form a general purpose microprocessor, optionally common with the communications microprocessor 22, or a microprocessor embedded in a GPS application specific integrated circuit (ASIC).

Figure 3:
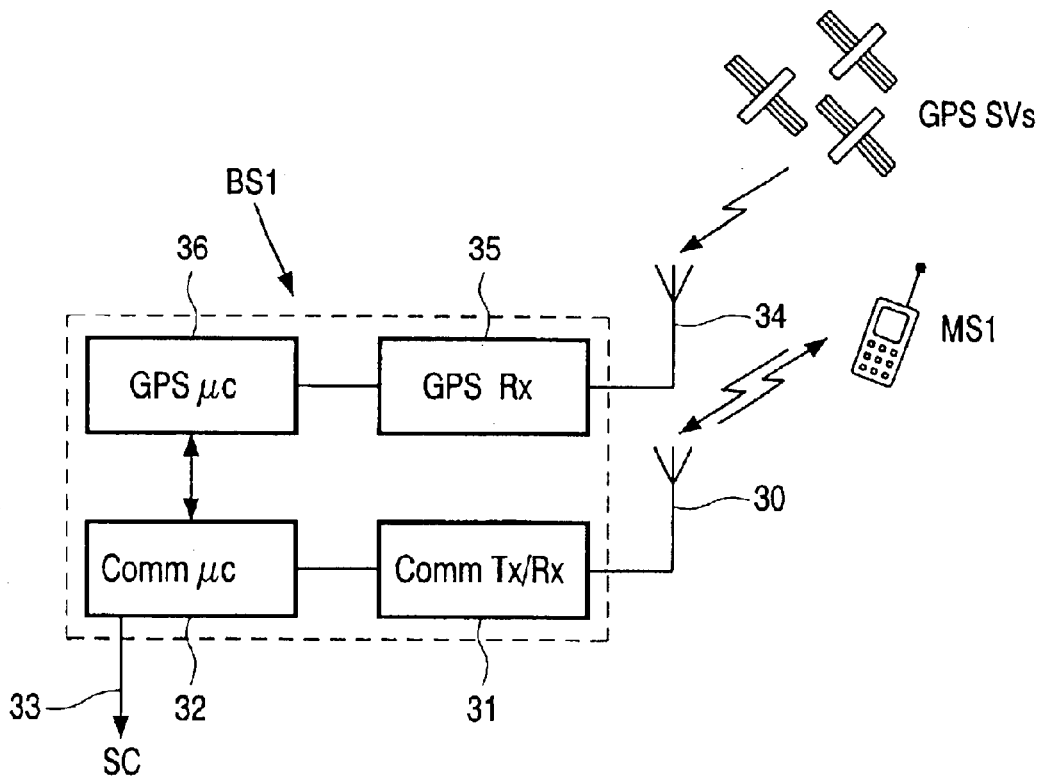
FIG. 3 shows, schematically, the base station BS1 of FIG. 1 in greater detail.

Cellular telephone network base station BS1 is shown schematically in FIG. 3. In additional to the conventional components of a base station, it further comprises a GPS antenna 34, receiver 35 and microprocessor 36 which are in substantially continual operation whereby the base station is in constant possession of up to date GPS satellite information. This information includes which of the orbiting satellites are presently in view (such satellites are likely to be common to both telephone and associated base station for even macrocells, obscuration aside); the GPS data message containing an up to date almanac and ephemeris data, and the Doppler shift and current code phase of the GPS satellites signals as observed by the base station.

In the event of the user of the mobile cellular telephone MS1 making an emergency call and under the control of the system controller SC via a two-way communication link CL1, the base station BS1 may provide this GPS satellite information to the telephone whereby it is then only required to sweep a narrowed range of frequencies and code phases in which the GPS PRN code is known to occupy, ensuring rapid code acquisition and TTFF.

In accordance with the present invention, the base station BS1 further provides the mobile telephone MS1 with the pseudorange measurements as observed by the GPS receiver 35 at the base station together with the co-ordinates of the base station. The position of the mobile telephone relative to the base station is then determined using the approximation of equations 1 and 2 described above. From the position of the mobile telephone relative to the base station and the co-ordinates of the base station, the absolute position of the mobile telephone can be determined which may then be transmitted to the base station and on to the emergency services operator (termed the Public Safety Answer Point in the US).

In the above example, the base station BS1 which provides the GPS receiver 24 in the mobile telephone with the pseudorange information to assist the GPS microprocessor 25 calculate its position is also the communications base station with which the mobile telephone communicates the emergency call, i.e. that which it is registered with. This need not be the case and indeed it may be a different base station to that with which the mobile telephone is registered, for example, where the pseudorange information is provided by a dedicated unit (termed a "location server") serving more than network cell. In such a case, it may be convenient for the location server to transmit the pseudorange information to the mobile telephone via the base station with which it is registered. It is possible for the location server to transmit tailored pseudorange information based on the location of the base station with which the mobile unit is registered (and presumably closest to). That is, providing reference pseudoranges and/or the GPS satellite position information by calculation based on the location of the base station with which the mobile unit is registered and GPS satellite signal information obtained from a GPS receiver located at the location server.

As previously indicated, providing reference pseudoranges and/or the GPS satellite position information by using a GPS receiver located at the reference location has the advantage that the resultant position fix incorporates the accuracy of differential GPS (DGPS). This can be explained by considering the make up of reference location and mobile unit pseudoranges. A reference pseudorange $PSR_{ref}$ and a pseudorange taken by a mobile unit $PSR_m$ can be expressed as follows:

$$PSR_{ref} = R_{ref} + c_{ref} + \delta_{ref} \quad \text{[Equation 3]}$$

$$PSR_m = R_m + c_m + \delta_m \quad \text{[Equation 4]}$$

where $R_m$ and $R_{ref}$ are the actual distances from the mobile unit and the reference location respectively to a GPS satellite; $c_m$ and $c_{ref}$ are the GPS clock errors at the mobile unit and the reference location respectively; and $\delta_m$ and $\delta_{ref}$ are the sum of other errors such are those attributable to selective availability and uncompensated atmospheric and relativistic effects.

Where a mobile unit is near to the reference location, such a mobile unit registered with a communications base station which is also the reference location, then the error $\delta_{ref}$ becomes very close to that of the mobile unit $\delta_m$. In a conventional DGPS system, the base station transmits the $\delta_{ref}$ error and the mobile unit can improve the accuracy of its position fix by subtracting them from its measured pseudoranges. This is of course known and is disclosed in U.S. Pat. No. 5,621,646 where the $\delta_{ref}$ term is referred to as a pseudorange residual". The present invention is distinguished over conventional DGPS in that the pseudoranges of the reference location are provided, not merely a error correction.

In so far as calculating from the ephemeris data satellite vector information in Cartesian form is concerned, the information is preferably provided with a common time base. For example, where the satellites position (x,y,z), velocity $(\dot{x},\dot{y},\dot{z})$ and acceleration $(\ddot{x},\ddot{y},\ddot{z})$ vectors are provided, they are provided for a given time $t_0$. At a different time t, either after $t_0$ or before if the satellite vector information is provided with respect to some time in the future, a GPS receiver would be able to use this data to determine a satellites position $(x_t, y_t, z_t)$ at time t using the satellite vector information. For example:

$$x_t = x + \dot{x}\delta t + \frac{\ddot{x}\delta t^2}{2}$$

$$y_t = y + \dot{y}\delta t + \frac{\ddot{y}\delta t^2}{2}$$

$$z_t = z + \dot{z}\delta t + \frac{\ddot{z}\delta t^2}{2}$$

where $\delta t = t - t_0$.

Of course, the greater $\delta t$, the less accurate the extrapolation will become. Also, higher order derivatives would increase the accuracy but also increase the data required to be transmitted to the mobile unit, but such use could be tailored for different applications. Similarly, the acceleration term could be omitted if the period of validity of the data was not needed to be very long.

As an alternative to the early-late correlation methods, fast convolution methods and in particular, involving Fast Fourier Transforms (FFTs), may be used in order to acquired the PRN codes. Such convolution methods are described in a paper entitled "FFT processing of direct sequence spreading codes using modern DSP microprocessors" by Robert G Davenport, IEEE 1991 National Aerospace and Electronics Conference NAECON 1991, volume 1, pages 98 to 105, and also in U.S. Pat. No. 5,663,734. The method of the present invention is equally is applicable such convolution methods.

The invention has largely been described in the context of NAVSTAR GPS, the all weather, spaced based navigation system developed and currently operated by the US Department of Defense. However, it will be appreciated that the general underlying principles of GPS are universal and not merely limited to NAVSTAR. Accordingly, unless otherwise qualified, GPS is intended to refer to any positioning system comprising a plurality of radio transmitters at different locations and a receiver which determines its location based on the time of arrival of the transmissions of the radio transmitters.

From a reading of the present disclosure, other modifications will be apparent to the skilled person skilled and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

What is claimed is:

1. A mobile unit (MS1) comprising a communications receiver (21) for receiving reference pseudoranges corresponding to a reference location (BS1) situated remote from the mobile unit (MS1); a GPS receiver for measuring mobile unit pseudoranges (MS1); and a GPS processor (24) for determining the position of the mobile unit (MS1) relative to the reference location (BS1) as a function of both the reference pseudoranges and the mobile unit pseudoranges.

2. A mobile unit (MS1) according to claim 1 wherein the GPS receiver (24) is further configured to determine the absolute position of the mobile unit (MS1) from both reference location (BS1) and the relative position of the mobile unit (MS1) to the reference location (BS1).

3. A mobile unit (MS1) comprising a GPS receiver (24) for measuring pseudoranges at the mobile unit (MS1); and a GPS processor (24) for determining the position of the mobile unit (MS1) relative to a nearby reference location (BS1) using the pseudoranges, and determining the absolute position of the mobile unit (MS1) from both the reference location and the relative position of the mobile unit (MS1) to the reference location (BS1).

4. A mobile unit (MS1) comprising a communications receiver (21) for receiving satellite vector information in Cartesian form describing either or both of the position or movement of GPS satellites; a GPS receiver (24) for measuring mobile unit pseudoranges from GPS satellite signals modulated by GPS ephemeris data in the form of Keplerian parameters; and a GPS processor (25) for determining the position of the mobile unit (MS1) as a function of both the satellite vector information and the mobile unit pseudoranges.

5. A mobile unit (MS1) according to claim 4 wherein the satellite vector information comprises position (x,y,z) and velocity ($\dot{x}, \dot{y}, \dot{z}$) vectors describing the position and movement of the GPS satellites respectively.

6. A mobile unit (MS1) according to claim 4 wherein the satellite vector information comprises acceleration ($\ddot{x}, \ddot{y}, \ddot{z}$) vectors describing the movement of the GPS satellites.

7. A mobile unit (MS1) according to claim 4 wherein the satellite vector information comprises $4^{th}$ or higher order vectors describing the movement of the GPS satellites.

* * * * *